May 13, 1930. M. O. JENNINGS 1,758,256
SHOE HEATER
Filed Jan. 31, 1925
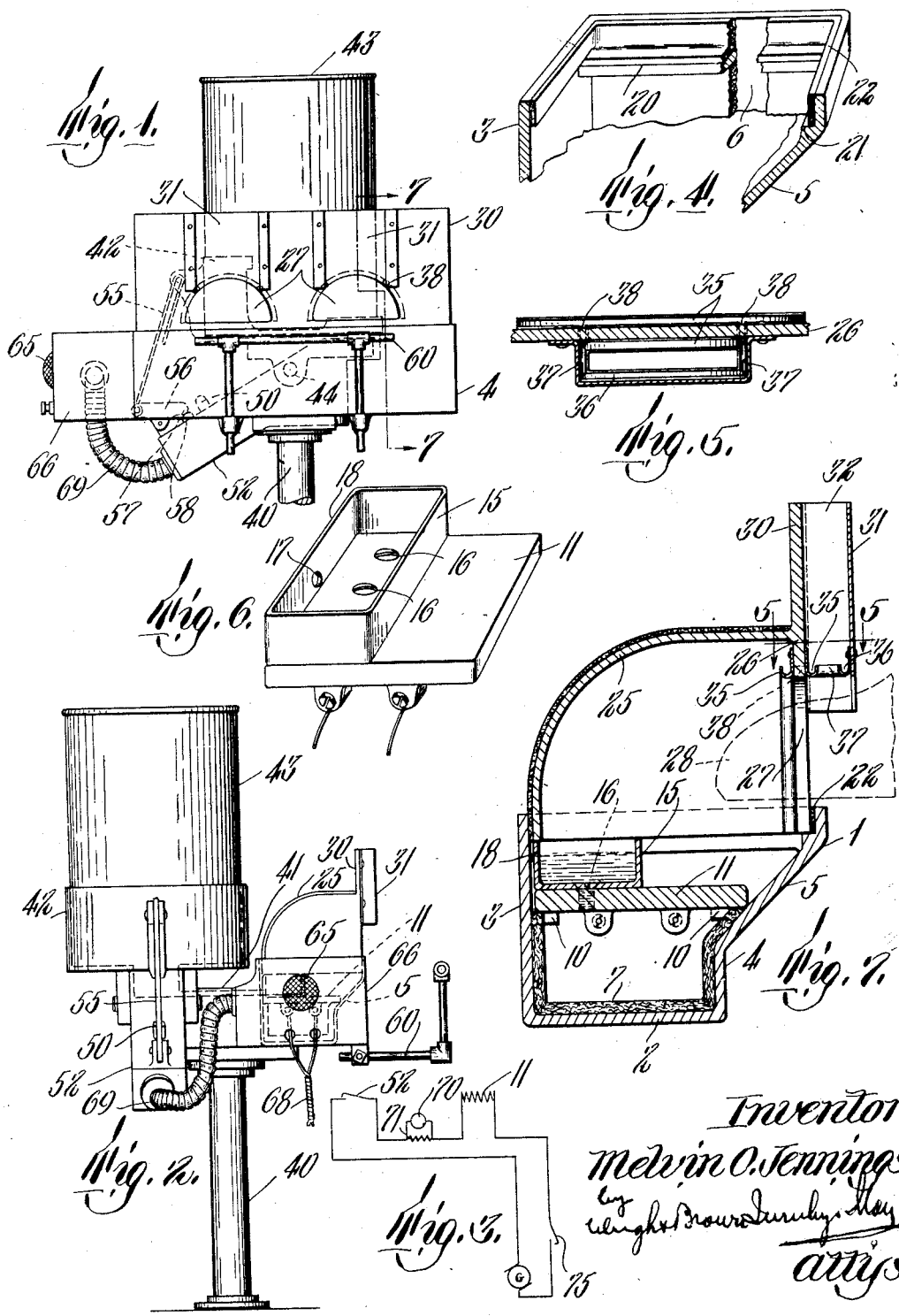
Inventor:
Melvin O. Jennings
attys.

Patented May 13, 1930

1,758,256

UNITED STATES PATENT OFFICE

MELVIN O. JENNINGS, OF ARLINGTON, MASSACHUSETTS, ASSIGNOR TO HARRY H. BECKWITH, OF BROOKLINE, MASSACHUSETTS

SHOE HEATER

Application filed January 31, 1925. Serial No. 6,158.

This invention relates to heaters for treating shoes preparatory to the lasting operation in order to soften the toe stiffeners and the upper leather. Such heaters may be designed to supply moist as well as dry heat, the moist heat being commonly employed to soften the upper material while the dry heat is employed to soften the thermoplastic toe stiffeners which are now commonly used in the manufacture of shoes.

One of the objects of the present invention is to effect economy in the use of heat, this heat being derived from a relatively small electrical resistance unit.

Heretofore it has been usual to provide a pair of resistance units, one to produce dry heat and the other to vaporize water to produce moist heat. Considerable trouble has been experienced with this construction from the unit producing the vapor becoming overheated and destroyed when the supply of water has become exhausted.

According to the present invention, therefore, but one heating unit is employed to produce both the dry heat and the vapor. For this purpose the heating unit is formed as a flat plate, a portion of which supports and has fixed thereto a water receptacle in such manner that water therein is vaporized by heat conducted thereto from the heater. The remainder of the heating unit is effective in heating dry air. As this heating unit is designed for operation in the air, it does not become overheated in case no water is present.

As a still further precaution, however, the device of the present invention may be so designed that when the supply of water becomes nearly exhausted the unit is cut off from its supply of current automatically.

For a more complete understanding of this invention, further objects and advantageous details and combinations of parts, reference may be had to the accompanying drawings, in which Figure 1 is a front elevation of the heater.
Figure 2 is an end elevation thereof.
Figure 3 is a diagram of the electrical connections.
Figure 4 is a fragmentary detail in perspective.

Figure 5 is a detail section on line 5—5 of of Figure 7.
Figure 6 is a perspective of the heating unit and the water heating trough.
Figure 7 is a vertical section on line 7—7 of Figure 1.

The device as shown comprises an open topped receptacle 1 having a lower wall 2, a rear wall 3, a front wall 4 having its lower portion vertical and its upper portion inclined forwardly as at 5, and end walls 6. The lower portion of this receptacle is preferably provided with a heat insulating lining 7. At the upper edge of this lining are positioned at opposite ends of the receptacle, lugs 10 for supporting an electric heating unit 11. As shown best in Figure 6 this electric heating unit is in the form of a plate bridging the lower portion of the receptacle, but it may terminate somewhat short of the ends of the receptacle in order to provide an air space leading to and from the receptacle beneath the heating unit at opposite ends.

Along the rear edge of the heating unit may be fixed a trough 15, as shown in Figure 6, and for the purpose of attaching this trough in position in a manner to permit ready transfer of heat to the interior thereof from the heating unit it may be made fast to this heating unit by metallic fasteners such as screws 16. The trough 15 may have a perforation 17 through its rear wall through which water may be supplied to the interior thereof. The upper edge 18 of this trough is substantially on a level with a ledge 20 at each end of the receptacle, and a similar ledge 21 at the forward edge 4 thereof, and as shown, above this ledge is positioned a lining of heat insulating material as at 22. The ledges 20 and 21 and the rear edge 18 of the trough furnish a support for a hood 25 which more or less completely closes off the upper open top of the receptacle.

Through the forward wall 26 of this hood are one or more openings 27 through which the toe of a shoe, as at 28, may be inserted beneath the hood and into the chamber formed by this hood and the receptacle 1 above the heating unit 11. The forward wall 26 of the hood is upwardly extended as at 30 and arranged substantially parallel therewith above each of the openings 27 is a plate 31 spaced therefrom by side walls 32. The wall 30 together with the walls 31 and 32 form a chute or chimney on the outer face of the hood above each of the openings 27, this being for the purpose of creating a draft upwardly when the heater is in operation to cause the vapor which may escape from the openings 27 about the shoe to pass upwardly out of the way of the operator.

As these walls are likely to be somewhat cooler than the vapor, provision is made for conducting away the condensate from the vapor thereon in a manner to prevent it from dripping onto the shoe upper which it might stain. For this purpose the lower edge of the wall 26 is provided with marginal trough shaped elements 35 and the wall 31 is provided with a similar element 36. As the wall 31 as shown is of somewhat less width than the opening 27 (see Figure 1), it is preferable to join the outer trough 35 and the trough 36 by means of side troughs 37 to conduct the drip from the front wall 31 to the outer trough 35 from which it may pass through openings 38 through the wall 26 into the inner trough 35 from which it is conducted downwardly on opposite sides of the opening 27.

As shown the receptacle is supported on a supporting post or pillar 40 and is provided with a rearward extension 41 on which may be carried a tilting support 42 for a water tank 43. This support is pivoted as at 44 (see Figure 1) and is so balanced relatively to the water tank 43 that when the water becomes nearly exhausted therefrom the weight of the support and the tank causes it to rock out of vertical position, shown in Figure 1, so that its outer edge impinges on a switch button 50 of the electric switch controlling the supply of current to the heater 11, this switching being indicated diagrammatically in Figure 3 at 52. When the tank 43 is refilled and the support brought back to its vertical position where the weight of the parts and water maintains it, it acts to pull a link 55 upwardly, this link being attached to a lever 56 in such a manner that the end 57 of this lever impinges on a button 58 of the switch 52 to again make the electric connection through the heating unit 11. This construction is quite similar to that fully shown, described and claimed in my application for patent Serial No. 674,314, filed November 12, 1923, for shoe heaters. The tank 43 is intended to be placed in the support 42 in inverted position, permitting the water to flow therefrom under barometric control through the extension 41 and the opening 17 into the trough 15 in order to maintain water therein at a predetermined level so long as the water supply shall last in the tank 43.

At the forward end of the receptacle 1 is shown a supporting frame 60, which may be formed of piping, for supporting the rear portions of the shoes, the toes of which are positioned beneath the hood 25.

It will thus be seen that in this construction the same heater is employed both to produce the dry and the moist heat, and due to the fact that the receptacle and hood are quite thoroughly heat insulated, it is found that a relatively small heating unit is amply sufficient to produce both the dry and moist heat required for the tempering operation. Moreover, as the heater 11 is designed to operate in the air it does not become overheated and destroyed in case the water fails in the trough 15 and as the trough 15 is intimately fixed to the heating unit, as by screws 16, sufficient heat is conducted to the water therein to produce the vapor required, it being found in practice that bubbles of steam arise from the heads of each of the fastenings 16, the main portion of the water heating being done through these screws. The outer portion of the heater which comes close to the shoe is free to provide dry heat therefor which comes up beneath the shoe into contact with the projecting edges of the shoe stiffener which it is desired to soften, while the vapor rises to the upper portion of the chamber produced beneath the hood 25, and descends about the outer portion of the shoe upper into contact with the upper material which is thus effectively softened.

In order to provide a visible indication of the condition of the heating current, a pilot light may be employed, this being positioned beneath a suitable glass bull's-eye 65 in a junction box 66 at one end of the receptacle. The power wires 68 are led into this junction box and through a flexible conduit 69 to the switch 52. As shown in Figure 3, the pilot light 70 may be shunted about a resistance 71 in a lead between the switch 52 and the resistance heating unit 11 and if desired also a main control switch 75 may also be employed for controlling the current input to the device The heating unit with the trough fixed thereto is not per se claimed herein, but forms the subject matter of a divisional application Serial No. 419,881, filed January 10, 1930, for heater unit.

An embodiment of this invention having thus been described, it should be evident to those skilled in the art that various changes and modifications might be made therein without departing from the spirit or scope of the invention as defined by the appended claims.

I claim:

1. A device of the class described comprising a vapor chamber having an opening through which a portion of a shoe may be extended thereinto, a chute extending upwardly adjacent to said opening externally of said chamber and through which vapor passing through said opening may escape, and gutters about the lower margin of said chute for preventing moisture which condenses on the walls of said chute and chamber from dripping onto the shoe.

2. A device of the class described comprising an open topped receptacle, a heating unit in said receptacle formed as a flat horizontal plate, a trough fixed to said heating unit along one side of said receptacle and of less width than said unit, means for maintaining water in said trough to a predetermined level, said receptacle having a marginal ledge, and a hood having downwardly extending walls seated on said ledge and on one side of said trough, said hood having an opening in the wall remote from said trough through which the toe of a partly finished shoe may be inserted.

In testimony whereof I have affixed my signature.

MELVIN O. JENNINGS.